(12) United States Patent
Meade

(10) Patent No.: US 10,331,664 B2
(45) Date of Patent: Jun. 25, 2019

(54) SYSTEM AND METHOD OF INSURANCE DATABASE OPTIMIZATION USING SOCIAL NETWORKING

(75) Inventor: Kevin Meade, Norwich, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 905 days.

(21) Appl. No.: 13/242,610

(22) Filed: Sep. 23, 2011

(65) Prior Publication Data
US 2013/0080416 A1    Mar. 28, 2013

(51) Int. Cl.
*G06F 16/2453* (2019.01)

(52) U.S. Cl.
CPC ................. *G06F 16/2453* (2019.01)

(58) Field of Classification Search
CPC ......... G06F 17/30463; G06F 17/30864; G06F 17/30867; G06F 17/30442; G06F 17/30595; G06F 17/30713; G06F 17/30563–17/30566; G06F 16/2453
USPC ....................................................... 707/713
See application file for complete search history.

(56) References Cited

U.S. PATENT DOCUMENTS

| | | | |
|---|---|---|---|
| 5,504,886 A * | 4/1996 | Chang et al. | |
| 5,742,806 A * | 4/1998 | Reiner | G06F 17/30445 |
| 6,480,836 B1 * | 11/2002 | Colby | G06F 17/30312 707/717 |
| 8,103,526 B1 * | 1/2012 | Pallesen et al. | 705/4 |
| 2002/0055919 A1 * | 5/2002 | Mikheev | 707/3 |
| 2002/0095397 A1 * | 7/2002 | Koskas | 707/1 |
| 2002/0103793 A1 * | 8/2002 | Koller et al. | 707/3 |
| 2003/0093410 A1 * | 5/2003 | Couch | G06F 17/30554 |
| 2004/0133562 A1 * | 7/2004 | Toong et al. | 707/3 |
| 2005/0044063 A1 * | 2/2005 | Barsness et al. | 707/2 |
| 2005/0060292 A1 * | 3/2005 | Day | G06F 17/30474 |
| 2005/0256907 A1 | 11/2005 | Novik et al. | |
| 2006/0106847 A1 * | 5/2006 | Eckardt et al. | 707/101 |
| 2009/0037242 A1 * | 2/2009 | Ventura et al. | 705/7 |
| 2009/0077017 A1 * | 3/2009 | Belknap et al. | 707/2 |
| 2009/0094577 A1 * | 4/2009 | Fachat | G06F 9/4435 717/106 |
| 2009/0193006 A1 * | 7/2009 | Herrnstadt | G06F 17/30315 |
| 2009/0265335 A1 * | 10/2009 | Hoffman et al. | 707/5 |
| 2010/0005054 A1 * | 1/2010 | Smith | G06F 17/30498 707/E17.002 |
| 2010/0100398 A1 * | 4/2010 | Auker et al. | 705/4 |
| 2010/0223078 A1 * | 9/2010 | Willis et al. | 705/4 |
| 2011/0125705 A1 * | 5/2011 | Aski et al. | 707/602 |
| 2011/0125741 A1 * | 5/2011 | Brobst | 707/736 |
| 2011/0264618 A1 * | 10/2011 | Potdar | G06F 17/30389 707/602 |

(Continued)

*Primary Examiner* — James Trujillo
*Assistant Examiner* — Jessica N Le
(74) *Attorney, Agent, or Firm* — Volpe and Koenig, P.C.

(57) ABSTRACT

A system and method of collecting statistics on a database for performing at least one insurance related structured query language (SQL) query are disclosed. The system and method includes providing at least one insurance related SQL query, determining the relationships of tables subject to the provided at least one insurance related SQL query, transforming the determined relationships of tables into a display representing communities of tables, and collecting statistics on at least one community of tables based on the at least one insurance related SQL query. The tables of the system and method represent insurance data.

21 Claims, 7 Drawing Sheets

(56) References Cited

U.S. PATENT DOCUMENTS

| | | | |
|---|---|---|---|
| 2011/0295838 A1* | 12/2011 | Collins et al. | 707/715 |
| 2012/0078923 A1* | 3/2012 | Jain | G06F 17/303 |
| | | | 707/752 |
| 2013/0018849 A1* | 1/2013 | Johnston et al. | 707/687 |
| 2013/0031084 A1* | 1/2013 | Herrnstadt | 707/714 |
| 2013/0211860 A1* | 8/2013 | Seybold et al. | 705/4 |

* cited by examiner

US 10,331,664 B2

SYSTEM AND METHOD OF INSURANCE DATABASE OPTIMIZATION USING SOCIAL NETWORKING

FIELD OF INVENTION

The present invention is directed to database optimization, and more specifically to system and method of insurance database optimization using social networking.

BACKGROUND

Insurance companies deal with large amounts of data. This data includes: account information, such as insurance premiums, deductibles, coverage limits, and the like; profile information, such as social security numbers, age of each individual covered by a plan, marital status, employment information, residence address, length of commute to work, accident reports, driving records and the like; and property information, such as the types of properties covered by the insurance including homes, boats, cars, recreational vehicles and the like. By way of non-limiting example, an insurance company may have records about an individual representing the type of car that is owned including make, year, model, color, where the car is domiciled, whether the car is garaged, driveway parked, or parked on the street, the individual's age, residence, and commute distance, family history, and medical conditions. An individual's information may be expanded depending on the number of insurance or other products that the individual has with an insurance company. Factor this amount of data with the hundreds of thousands or even millions of individuals that an insurance company represents, and it is evident that the amount of data is extremely large.

In order to handle the data efficiently, insurance companies have turned to databases, and in particular to relational databases. A relational database is a grouping of data using common characteristics within the data set. The performance of a relational database is based on the amount of data that is included in the database, the commonality of the characteristics, and the query optimizer of the database. As the amount of data contained in relational databases has increased in the growing computer explosion, and the fact that the computer age has allowed insurance companies to incorporate and track more information, the performance of these relational databases has suffered.

A performance degradation of relational databases can have a dramatic impact on insurance companies. For example, insurance companies reduce the queries that are performed, thereby working with less information than an optimized database can provide. Additionally, the backup file sizes for these ever growing databases impart an ever increasing cost based on the size and the ability to create backup files. Further, random access memory and buffer need to be larger and/or more data pages need to be processed from disk.

This leaves the query optimizer as a driver of reversing the trend of slower relational datable performance as the optimizer minimizes the impact associated with the overall size of the database. The query optimizer operates by understanding facts about the data in the database. How well these facts are known, how many facts are understood, and the ability to collect the underlying facts determine the ability and functionality of the query optimizer.

In order to clearly set forth the issue related to the query optimizer and statistics collection, an analogy will focus on two rooms of boxes with a goal of moving all of the boxes together into a single room. By way of analogy, the rooms are data tables in a relational database and the boxes represent rows in the tables. Having two rooms presents two options—move all of the boxes from the first room to the second room or vice versa. Not knowing anything about the rooms, the boxes or the number of boxes in each room, makes the decision of which set of boxes to move blind as to which option is cheaper and more efficient. That is, easier to achieve. So without any information, a blind decision is made and all of the boxes in the first room are moved to the second room and the goal of getting all of the boxes in one room is achieved. However, it is unclear if the goal was achieved in the most efficient manner.

Now using the same initial scenario, some information about the number of boxes in each room is known; the first room has ten boxes and the second room has one. Using this information, the most efficient solution would be to move the one box from the second room to the first room.

Now with ten boxes in the first room and one box in the second room, it is determined that each of the ten boxes in the first room weighs one pound and the one box in the second room weighs five-hundred pounds. With this additional information, a more efficient solution is to move the ten one pound boxes from the first room to the second room.

Now in this scenario, additional information arises that there is a hand truck available in the second room. Using the hand truck, the five-hundred pound box is not too difficult to move and therefore the more efficient solution is to use the hand truck and move the one box from the second room to the first room.

These scenarios demonstrate, by way of analogy, that even with only two options, as more information is provided about the environment, the cost associated with selecting one room of boxes to be moved over the boxes in the other room changed and thus one of the options outweighed the other in efficiency. Gaining information about the number of boxes in a room and the weight of the boxes is statistics collection. Statistics collection provides information to optimize the task at hand. Providing information helps in selecting the most efficient optimization strategy, but misinformation and/or partial information may often lead to the selection of an inefficient solution.

Thus, there exists a need for a system and method that enables collection of statistics associated with a database, and identifies situations where only partial information about the database is obtained.

SUMMARY

A system and method of collecting statistics on a database for performing at least one insurance related structured query language (SQL) query are disclosed. The system for collecting statistics on a database for performing at least one insurance related query includes a processor for processing an insurance related query and a memory device configured to store information in a database, said database containing insurance related data organized in a plurality of tables relating the data in the database, wherein the plurality of tables are responsive to the insurance related query. The relationships of the plurality of tables are determined responsive to the insurance related query, and the relationships are transformed into a grouping of communities of tables.

The method of collecting statistics on a database for performing at least one insurance related structured query language (SQL) query includes processing at least one insurance related SQL query, determining the relationships of tables of a database stored in a memory device, the tables responsive to the at least one insurance related SQL query, and transforming the determined relationships of tables into a grouping representing communities of tables. The tables represent insurance data.

A computer readable medium including hardware design code stored thereon which when executed by a processor cause the system to perform a method for collecting statistics on a database for performing at least one insurance related SQL query is also disclosed. The performed method includes processing at least one insurance related SQL query, determining the relationships of tables of a database stored in a memory device, the tables responsive to the at least one insurance related SQL query, and transforming the determined relationships of tables into a grouping representing communities of tables. The tables represent data associated with at least one aspect of insurance.

The method of optimizing an database based on a structured query language (SQL) workload including at least one query of the database may include determining the relationships of tables of a database stored in a memory device, the tables responsive to the at least one insurance related SQL workload, transforming the determined relationships into a node form, formatting the node form into a data stream, and displaying the data stream in one or more pictures for visualizing communities of tables associated with the SQL workload in the database. The database is optimized by collecting statistics on communities of tables.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purpose of clarity, many other elements found in insurance databases and/or computing systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

The present invention includes a system and method of collecting statistics on a database for performing at least one insurance related structured query language (SQL) query. The system and method include a database containing insurance related data and at least one insurance related SQL query. The system and method include a plurality of tables relating the data in the database and determining the relationships of tables subject to the provided at least one insurance related SQL query. The system and method include a display that displays the transformed determined relationships of tables representing communities of tables. The system and method include collecting statistics on at least one community of tables based on the at least one insurance related SQL query.

Figure 1:
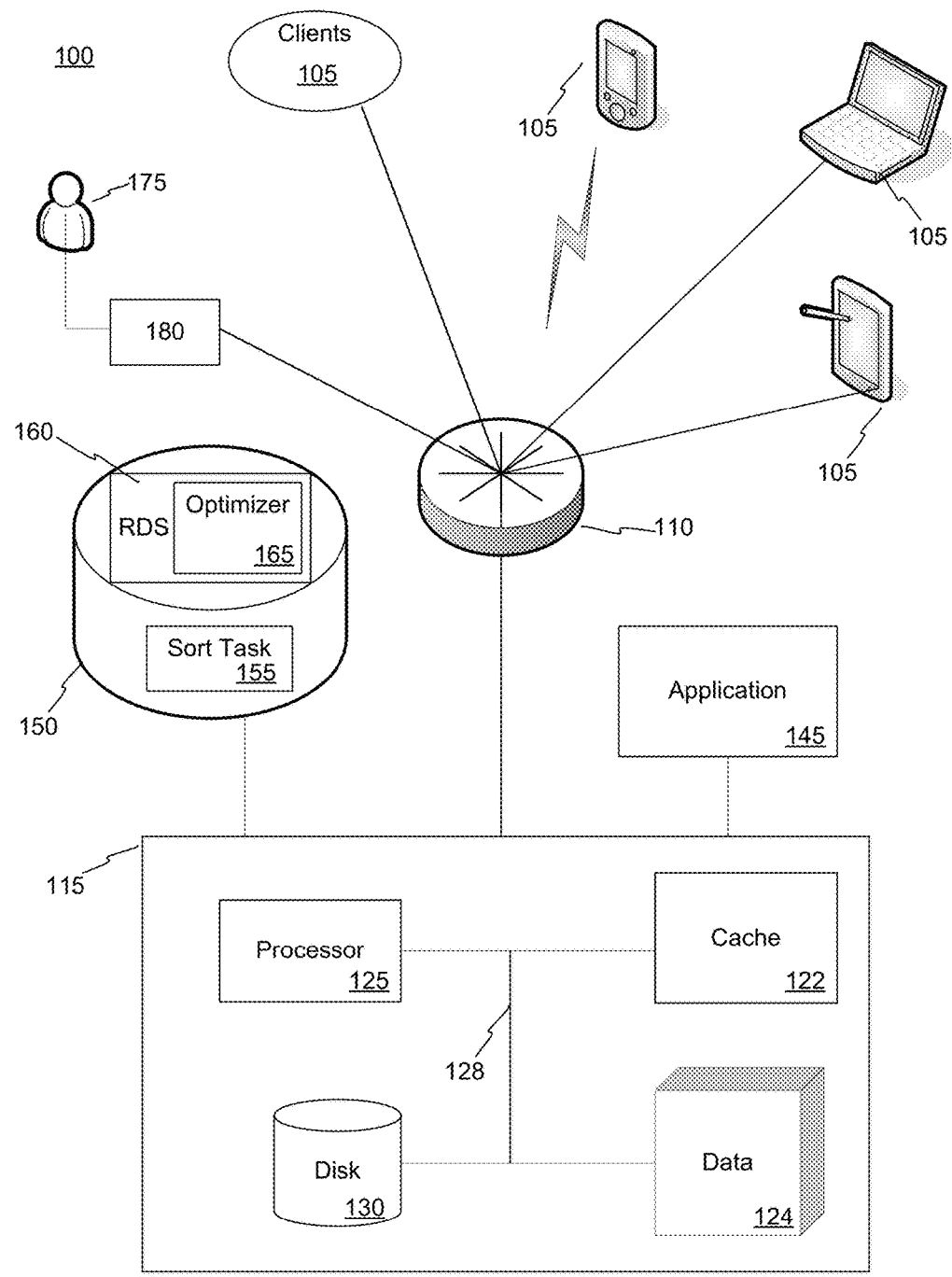
FIG. 1 illustrates a generalized view of a processing apparatus in a computer network which may be used to carry out the present invention.

FIG. 1 illustrates a generalized view of a processing apparatus 100 in a computer network which may be used to carry out the present invention. Processing apparatus 100 may include a server 115 communicatively coupled to a network 110 with network 110 providing access to a plurality of clients 105. Server 115 may include one or more processors 125, one or more disks or other storage medium 130, and at least one memory cache 122, with each of cache 122, processor 125, and disk 130 including some form of data 124 interconnected via bus 128. Disk 130 may include, but is not limited to, a diskette, hard drive, CD-ROM, thumb drive, hard file, or Redundant Array of Independent Disks (RAID). While data is represented in FIG. 1 with its own location 124, data 124 may be included throughout processing apparatus 100, and specifically may be included on cache 122, processor 125 and disk 130. Data 124 may be raw, preprocessed or some combination of the two states. There may be multiple clients 105, which may access data 124 over network 110. Data 124, and specifically preprocessed data, may reside at server 115. Any preprocessing, as well as any online processing, may take place via processor 125, for example. Disk 130 may enable storage of data 124.

An application program, such as a relational database manager 150, may be loaded into a memory and/or be resident on disk 130. Relational database manager 150 is an extension of the operating system of processing apparatus 100. Relational database manager 150 comprises a comprehensive set of relational database manager tasks, including but not limited to, a sort task 155, relational data services (RDS) 160, and an optimizer 165. Relational database manager 150 provides instructions to the processor 125 to enable processing apparatus 100 to perform relational database functions.

A user 175, who may be an insurance company, employee or contractor, utilizing one of the plurality of clients 105, accesses relational database manager 150 through an input/output (I/O) device 180, which allows connection directly to relational database manager 150 or through network 110, for example. Clients 105 may take the form of a mainframe, thin client, personal computer, mobile device, pad computer, or the like. Information regarding relational database manager 150 and its data may be displayed to user 175 through I/O device 180. In addition to a user 175 interacting with the relational database manager 150, one or more applications 145 interact with database manager 150. This interaction takes the form of structured query language (SQL) commands in an application 145, for example. Optimizer 165 may be a portion of and/or a component of RDS 160. RDS 160 decides which of several methods of accessing data may be used for a query statement; for example, whether an index should be used or a sequential scan, or whether a sort operation may be performed, or the like.

A relational database through relational database manager 150 matches data by using common characteristics found within a data set. The resulting groups of data are organized and are much easier to understand. For example, an insurance company data set containing all the car accidents in a town can be grouped by the year each accident occurred, the damage caused, the insured's last name and so on. Such a grouping uses a relational model. The software used to provide this grouping is referred to as the relational database manager 150 and/or a relational database management system. Relational databases may be used in storing data like insurance data, financial records, medical records, personal information and manufacturing and logistical data. A relational database is a collection of relations, frequently called tables, which is organized into rows and columns. In a relational database, all data are stored and accessed via relations.

For example in the insurance industry, a relational database may be queried to provide a CLIENT REQUEST RATE FACT QUOTE, BUILD PERSISTENT CACHE CA, BUILD PERSISTENT CACHE CRA, BUILD PERSISTENT CACHE CRAA, and BUILD PERSISTENT CACHE OHD. CLIENT REQUEST RATE FACT QUOTE query may provide a rate fact quote for a client based on a myriad of factors associated with quoting in the insurance industry. BUILD PERSISTENT CACHE CA returns the action date for a given client request and action type code. In the insurance industry, action dates for certain action codes may be important. BUILD PERSISTENT CACHE CRA may provide the action date from a client action table with matched mapping action tables. Such a query may have outer joins and links to other tables that may not be useful to the underlying query. BUILD PERSISTENT CACHE CRAA may return an attribute value with a matched client ID from an action mapping table, for example. This query may provide the basis for providing information in a client request fact table. This query may include unnecessary joins. BUILD PERSISTENT CACHE OHD returns calendar days and business days between a task start date and task end date for a given task identification from a client task table. This query uses a for loop in the function.

Using a database that is in either an inefficiently optimized or un-optimized form may enable the CLIENT REQUEST RATE FACT QUOTE query to be performed in approximately three hours. The same query run on a database containing the same data optimized using social networking may take less than a minute. Similarly, running a BUILD PERSISTENT CACHE CA on a social networked optimized database may reduce the time from two hours to approximately one minute. Running BUILD PERSISTENT CACHE CRA and BUILD PERSISTENT CACHE CRAA may each be reduced from two hours to approximately twenty minutes, and BUILD PERSISTENT CACHE OHD may be reduced from two hours to approximately two minutes.

Figure 2:
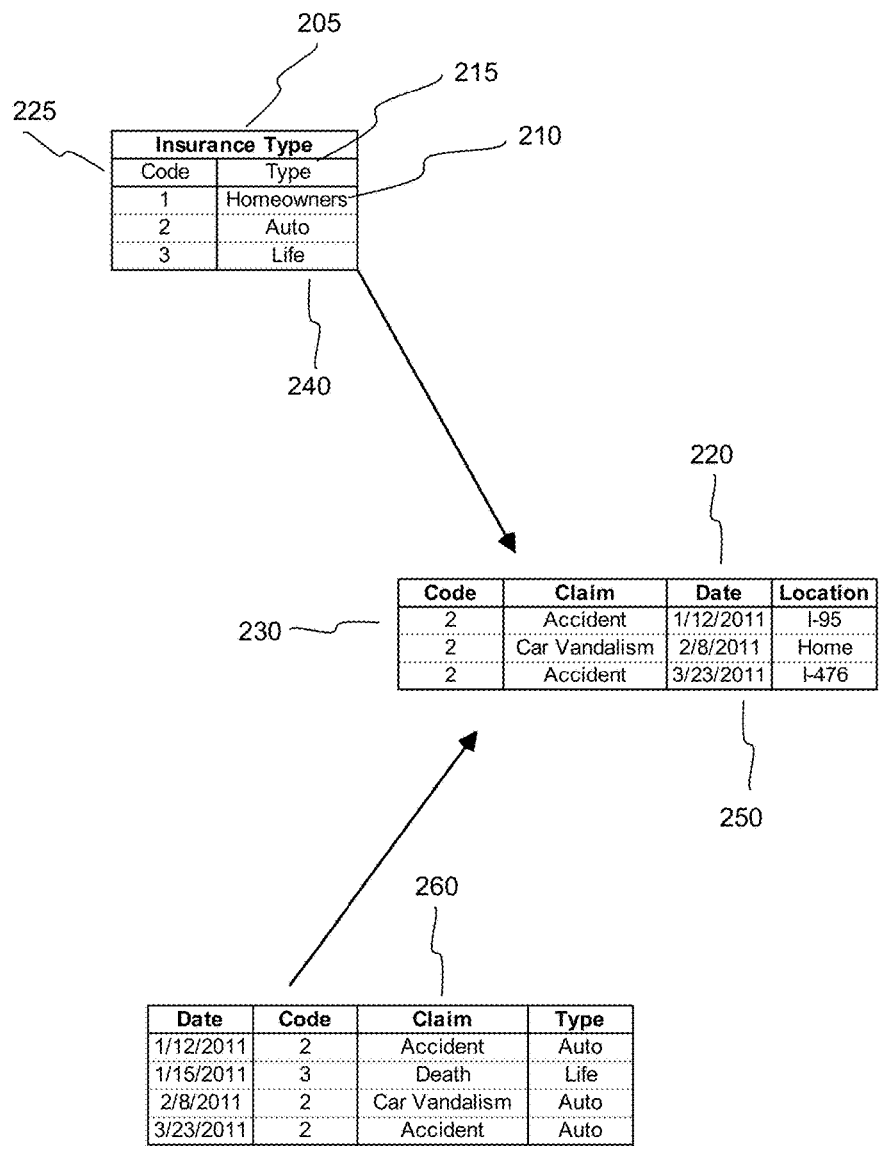
FIG. 2 illustrates a relational model that may be utilized in the processing apparatus of FIG. 1.

FIG. 2 illustrates a relational model 200 utilized in processing apparatus 100 of FIG. 1. Relational model 200 may include data shown in tables 240, 250, 260. In table 240, for example, there is insurance information including a code and type of insurance 210. Table 250 shows the data representing code key 2 of table 240, which identifies a type of insurance 210 as automobile insurance, for example. As seen in table 250, each row 230 indicates a representative claim on an automobile insurance policy. Similarly, each column 220 represents a set of information about the auto claim depicted in row 230. For example, columns 220 include code, claim, date and location. A first row 230 shows a code "2," representing an auto "accident" claim that occurred on "Jan. 12, 2011" on "1-95."

In SQL language, database tables 240, 250, 260 may be defined and described using a CREATE TABLE command. CREATE TABLE is an example of a SQL data definition statement. Each CREATE TABLE statement gives the name 205 of the table 240, and the names of its columns 215, 225, which are data "type" and "code," respectively. After the user executes the CREATE TABLE statement, table 250 may be empty initially, that is the table will not contain any data rows 230. However, a user inserts data rows 230 using a SQL INSERT statement. The user is now able to do useful operations with table 240, along with any other tables that have been created. For example, the data in table 240 may be ordered by code 225 for display to a user. Table 240 may be joined with another table, such as with a table having corresponding information for each of the codes. The data may be grouped by a category of the data such as selecting accidents and grouping the accidents by a given location, for example. If a MERGE JOIN operation is used to join multiple tables, two at a time, the relational database manager performs a sort operation, if indexes are not available, to order the rows sequentially from the tables.

The system and method of this invention allows the sorted rows to be returned to RDS 160, in one of two modes. One mode, referred to as the disk output mode, results in all the sorted data being written to disk 130 in the form of an ordered temporary file. In the other mode, referred to as the fast direct output mode, each row is placed into a final sorted order, to pass directly back through RDS 160 to the user/application when requested. Each mode has performance advantages that depend on how the results of the sorted rows will be used. For example, if the sorted data 124 is going to be used once, as determined by optimizer 165, data 124 may pass directly through RDS 160 to the user/application that requested the data, thereby avoiding the time needed for writing to, and later retrieving from, a file. However, if sorted data 124 is to be used more than once, data 124 may be written to disk 130 allowing multiple usages with a single sort. For example, if optimizer 165 determines that the plan was a root plan, then sorted data 124 would be used only once and the fast direct output mode may be enabled.

RDS 160 may pre-compile SQL statements that require sort 155. RDS 160 goes through a decision process to determine if it is more efficient to have sorted data 124 go directly back to RDS 160, or to be written to disk 130. RDS 160 recognizes this by examining the operation type requested. Optimizer 165 of RDS 160 selects the optimal method for sort output with no special knowledge of action by the user/application.

An index is one way of providing quicker access to data. Indices can be created on any combination of tables. Queries that filter using attributes of tables can find matches randomly using the index, without having to check each in turn. This is analogous to using the index of a book to go directly to the page on which the information is found, i.e., you do not have to read the entire book to find what you are looking for. Relational databases typically supply multiple indexing techniques, each of which is optimal for some combination of data distribution, relation size, and typical access pattern including indexing such as B+ trees, R-trees, and Bitmap index|bitmaps, and hash indices.

In order for a query optimizer to work correctly, the optimizer may need to understand some facts about the data contained in the database. For the optimizer to get these facts, statistics may be collected on the data. Currently, the collection of statistics may have a positive effect on some queries but cause others to degrade and/or regress.

Analogizing the two room example above to a relational database, the task of moving boxes to one room is referred to as a SQL query, the rooms are called tables, and the boxes are called rows. Statistics may be collected on the tables, and thereby the rows and the problems that come from poor statistics collection practices manifest as statistics are collected on some of the tables in a query but not all. A query may have tables in common with other queries. Even if statistics are collected for all tables in a query, related queries may be affected because collecting statistics on all tables in a first query may result in collecting statistics on only some of the tables in a second query, thus causing performance degradation on the second query. For each first query, there are often many second queries, or second, third, fourth queries, etc.

As an example of the case where statistics are only collected on some of the tables in a Query, the following query is representative.

```
SELECT  d.dept_name,
        e.emp_name
FROM    dept d,
        emp e
WHERE   e.dept_id = d.dept_id
```

This query seeks to join two tables together (DEPT, EMP). This is a typical employee report that shows employees by department. In this situation, where we know nothing about either table, the tables may be combined starting with DEPT and tie DEPT rows to EMP, or start with EMP and tie EMP rows to DEPT.

throughout database and database administrator may be used interchangeability, without identifying the specific entity that performs a given function being discussed. For example, the present disclosure may disclose a database administrator performing a function. Such a function may be interchangeably performed by the database itself. Similarly, functions performed by the database in the present disclosure may be performed by a database administrator.

In another scenario of the SQL query above, the database questions EMP, and because statistics were collected on EMP, EMP reports true information, but this information is not nearly at attractive as the default information EMP provided the database in the previous scenario. When the database questions DEPT and is provided the default statistics, DEPT looks more attractive than EMP. EMP reported real information based on statistics collection, but looks less attractive as a driving table for the query than DEPT. Thus, the database selects DEPT as the driving table. As a result, data is being fetched at a slower rate, even though collecting statistics is supposed to make things run faster. The partial collection of statistics, such as by only collecting statistics on EMP, made the database run slower. If the database had collected statistics for EMP and DEPT, then both tables would have reported real information and the database would have been able to make a fair assessment between the two in selecting a place to start.

While the above scenarios use two tables, SQL queries may be, and usually are, even more involved. Also, collecting statistics on all tables in query A may result in collecting statistics on only some of the tables in query B. See for example, the following SQL queries:

| Left Query: | | Center Query: | | Right Query: | |
|---|---|---|---|---|---|
| SELECT | d.dept_name, e.emp_name | SELECT | e.emp_name, t.proj_name | SELECT | t.timesheet_date, p.proj_name |
| FROM | dept d, emp e | FROM | emp e, timesheet t | FROM | timesheet t, proj p |
| WHERE | e.dept_id = d.dept_id | WHERE | t.emp_id = e.emp_id | WHERE | p.timesheet_id = t.timesheet_id |

When the database executes this query, the database may question each table to understand about the table. EMP may provide information to the database, but since no statistics were collected on EMP, EMP has no facts to provide. EMP instead provides default statistics to the database as the facts about EMP. Similarly, DEPT is in the same situation as EMP. Statistics were never collected on DEPT so DEPT has no facts to present. DEPT instead provides default statistics to the database as the facts about DEPT.

Since both tables provide default statistics, both tables look equally attractive to the database as a place to start the query. Thus, the database selects one of the two tables for no particular reason to be its driving table for this query. So for the sake of explanation, the database selects EMP as the driving table for this query and the SQL query is performed, blindly with respect to performance efficiency. For the sake of discussion, suppose using EMP is more efficient than using DEPT, therefore the more efficient solution was blindly chosen.

The database may subsequently realize that, while statistics are supposed to be collected on the tables in the database, EMP had no statistics. The database administrator may plan to collect statistics for EMP. As used herein If the database collects statistics on DEPT and EMP, the query on the left above is operable, as this query calls DEPT and EMP. The center query, on the other hand, is provided with statistics for only some of the tables the query uses, which is EMP, but not TIMESHEET. Thus, collecting statistics on the left query, fixes the performance for the left query, but may result in degrading the performance of the center query. In order to improve the center query, statistics must be collected on TIMESHEET as well. Thus collecting statistics on three tables (DEPT, EMP, TIMESHEET) will fix performance for the left and center queries. But collecting statistics on the three aforementioned tables will result in statistics collection for only some of the tables in the right query, which is TIMESHEET but not PROJ. As a result, in fixing the left and center queries, the performance of the right query is degraded. In order to improve the right query as well, statistics must be collected on four tables (DEPT, EMP, TIMESHEET, PROJ). This pattern may continue as more and more queries are added, and more tables are included. Therefore, this collection of statistics may continually degrade the performance in that the statistics collection may cause a string of cascading performance degradations. This problem is typically exacerbated in a relational database because while the examples above have only four tables, the database may have four hundred or more. While the example uses three queries in a SQL workload, a database may easily be running fifty thousand queries. Generally, when analyzing the full database, the cascading performance degradations increase and all of the variability of interrelated tables cannot be considered.

Statistics collection using social networking methodology allows for the collection of statistics without causing performance to degrade. Combining social networking with relational databases manifests in the interrelation of tables, allows for an analysis of the full database and an understanding of the cascading performance degradation. Done correctly, statistics collection may provide information and may demonstrate the potential options which are likely to be efficient and which options are likely to be costly.

The social networking methodology herein creates a profile and social links to represent each SQL statement and the tables that are involved in the statement. The profile and social links are analogous to the links created in social networking sites. The social networking methodology employed in the database optimization may include both the individual-centered features and the overall online community that tend to be group-centered. As with social networking sites, the SQL statements and associated tables are encouraged to create profiles containing a myriad of information as discussed in more detail below.

There are many tools that have been developed to analyze the relationships and commonalities between people using social networking. These tools may analyze relationship data in a way that allows users to see how people form into communities that have commonalities. Tables in a relational database interconnect and interrelate with each other. Advantages may be gained from understanding the interrelations and may prevent the negative cascading problem prevalent with databases.

The relationships between tables may be exploited in a relational database by determining these relationships using social networking tools. Connections between tables may be collected, formatted, and extracted from the relational database into a file that can be displayed to show how tables form communities based on the relationships between the tables. The relationship data comes from an analysis the SQL code that uses the tables.

A SQL workload runs on the database, such as a batch system, for example. The database, as part of what it normally does, parses this SQL and among other things determines the table dependencies for each SQL statement in the workload. By way of non-limiting example only, Oracle provides the following metadata objects:

| Name | Null? | Type |
|---|---|---|
| SQL> desc v$object_dependency | | |
| FROM_ADDRESS | | RAW(8) |
| FROM_HASH | | NUMBER |
| TO_OWNER | | VARCHAR2(64) |
| TO_NAME | | VARCHAR2(1000) |
| TO_ADDRESS | | RAW(8) |
| TO_HASH | | NUMBER |
| TO_TYPE | | NUMBER |
| SQL> desc dba_objects | | |
| OWNER | | VARCHAR2(30) |
| OBJECT_NAME | | VARCHAR2(128) |
| SUBOBJECT_NAME | | VARCHAR2(30) |
| OBJECT_ID | | NUMBER |

-continued

| Name | Null? | Type |
|---|---|---|
| DATA_OBJECT_ID | | NUMBER |
| OBJECT_TYPE | | VARCHAR2(18) |
| CREATED | | DATE |
| LAST_DDL_TIME | | DATE |
| TIMESTAMP | | VARCHAR2(19) |
| STATUS | | VARCHAR2(7) |
| TEMPORARY | | VARCHAR2(1) |
| GENERATED | | VARCHAR2(1) |
| SECONDARY | | VARCHAR2(1). |

The above two metadata objects include information about how tables are related to each other based on the SQL workload that executes on a database. From the Oracle metadata object V$OBJECT_DEPENDENCY, the columns FROM_ADDRESS/FROM_HASH represents a single SQL statement, and the columns TO_OWNER/TO_NAME provides the name of an object needed by the query. The table DBA_OBJECTS instructs which of these objects are tables.

Figure 3:
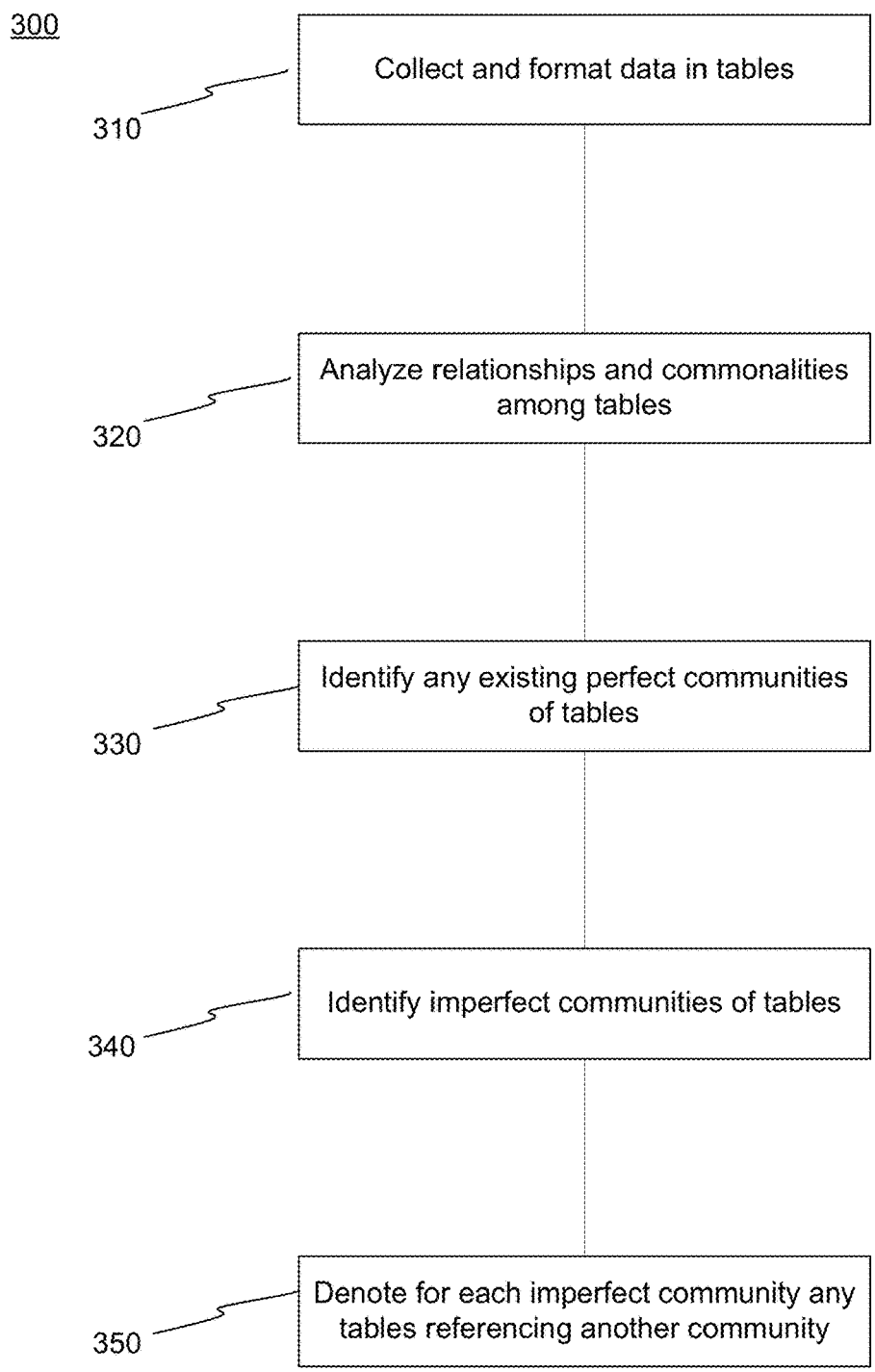
FIG. 3 illustrates a method of optimizing a database.

FIG. 3 illustrates a method 300 of optimizing a database. Method 300 includes collecting and formatting data in tables at step 310, analyzing the relationships and commonalities among the collected and formatted data tables in step 320, identifying any perfect communities of tables at step 330, and identifying imperfect communities of tables in step 340. A perfect community is a community of tables with each table in the community having no interrelation to any other table outside of the community. An imperfect community is a community of tables that has at least one table in the community having an interrelation to at least one table outside of the community. Method 300 at step 350 denotes for each imperfect community at least one table referencing a table in another community, which is the cause of the community being imperfect. Imperfect communities, generally, may lead to cascading problems as described above with respect to the left, center and right queries.

Figure 4:
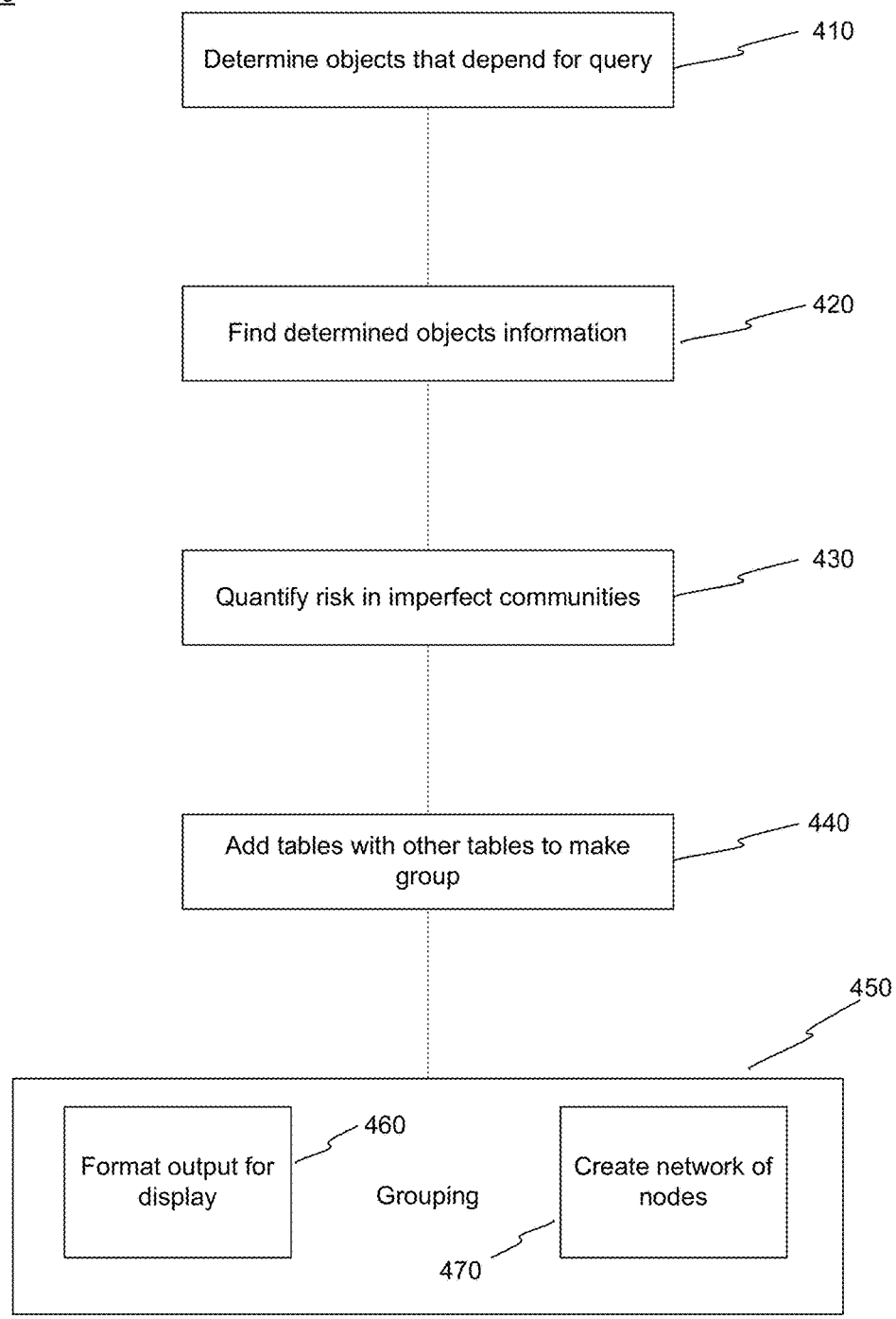
FIG. 4 illustrates a method of using social networking to optimize a database.

FIG. 4 illustrates a method 400 of using social networking to optimize a database. Method 400 includes determining the objects that depend from a SQL query at step 410. This may be determined "in flight" as necessary. Step 410 may include examining the metadata for each SQL statement of interest to determine the tables that will be used in stratifying the SQL statement. For example, the following code may be used to determine the objects that depend from a SQL query:

```
my_v$object_dependency as (
    select *
    from v$object_dependency
    where to_type = 2
    and to_owner = 'DWSTAGE'
```

Method 400 includes finding the determined objects information at step 420. This finding may determine the owner of the information. For example, the following code may be used to find the determined objects information:

```
, my_dba_objects as (
    select min(object_id) object_id,owner,object_name
    from dba_objects
    where owner = 'DWSTAGE'
    and (owner,object_name) in (select
        to_owner,to_name from
```

Method 400 includes quantifying the risk in imperfect communities at step 430. As discussed herein, imperfect communities may exist and the risk associated with performance degradation may be mitigated by knowing the communities and tables that are interrelated with other communities and by taking corrective action in optimizing the database. Step 430 includes constructing linkages between objects used in SQL statements and creating a network of linked tables used in the statements. These linked tables may be constrained by the SQL statement running in the database. For example, the following code may be used to quantify the risk in imperfect communities:

```
        my_v$object_dependency)
            group by owner,object_name
            union
            select        -1*rownum
object_id,'APPLICATION QUERY', statement_id object_name
            from (
                select distinct from_address| '.'| |from_hash
                statement_id from my_v$object_dependency
            )
        )
```

Method 400 includes adding tables with other tables to make a group at step 440. For example, the following code may be used to add tables with other tables to make a group:

```
, paired_tables as (
        select a2.object_id source_id,b2.object_id target_id
```

-continued

```
        from my_v$object_dependency a
            , my_v$object_dependency b
            , my_dba_objects a2
            , my_dba_objects b2
        where a.from_address = b.from_address
            and a.from_hash = b.from_hash
            and a.to_owner = a2.owner
            and a.to_name = a2.object_name
            and b.to_owner = b2.owner
            and b.to_name = b2.object_name
            and a2.owner != 'APPLICATION QUERY'
            and b2.owner != 'APPLICATION QUERY'
            and a2.object_id < b2.object_id
        )
--
```

Method 400 includes grouping tables in communal nodes at step 450. One method of grouping the tables may be to display a grouping of tables to provide visualization of the grouping of the data. This display may be achieved using a display software for visualization of data, such as Vizster, and/or may be performed by coding within apparatus 100, for example. Displaying tables at step 450 includes converting the network of linked nodes from the analysis of currently executing SQL statements into an XML formatted stream of data that is loaded in the display program or other displaying code. The resulting display is of a community of tables given the current SQL workload. A code for building communities that configures for displaying results using Vizster includes the following example:

```
drop table my_table_groups
/
create table my_table_groups
(
    group_id number not null
, object_id number not null
)
/
create index my_table_groups_pk on my_table_groups (object_id,group_id)
/
alter table my_table_groups
    add constraint my_table_groups_pk primary key (object_id,group_id)
/
drop table xvvizster_TABLE_edges
/
create table xvvizster_TABLE_edges
as
select distinct *
from vvizster_TABLE_edges
where source_id != 0
and target id != 0
/
create or replace
procedure my_table_groups_build
as
    source_id_v number;
    group_id_v number;
    sanity_check_v number;
    max_tables_v number;
    procedure get_start_of_a_new_chain (source_id_p in out number) is
    begin null;
    --
    -- look for a table not already in a group
    -- if we don't find one then do nothing (see NO_DATA_FOUND exception handler below)
    --
    select min(source_id)
    into source_id_p
    from xvvizster_TABLE_edges
    where source_id != 0
    and target_id != 0
    and not exists
        (
        select null
```

```
                    from my_table_groups
                    where my_table_groups.object_id = xvvizster_TABLE_edges.source_id
                )
            and rownum = 1
            ;
            if source_id_p is null then raise no_data_found; end if;
            --
            -- since there was no NO_DATA_FOUND error we must have an object we
have not seen yet
            -- so start the chain by recording this table
            --
            group_id_v := group_id_v + 1;
            insert  into  my_table_groups  (group_id,object_id)  values
(group_id_v,source_id_p);
            exception when no_data_found then null;
        end;
        procedure fill_chain (object_id_p in number) is
            object_id_v number;
        begin null;
            for r1 in (
                    select decode(source_id,object_id_p,target_id,source_id) object_id
                    from xvvizster_TABLE_edges
                    where (
                        source_id = object_id_p and target_id != 0 or
                        target_id = object_id_p and source_id != 0
                    )
                ) loop null;
            begin null;
                select object_id
                into object_id_v
                from my_table_groups
                where object_id = r1.object_id
                ;
            exception when no_data_found then
                insert into my_table_groups
                    (group_id,object_id)
                    values
                    (group_id_v,r1.object_id)
                ;
                fill_chain (r1.object_id);
            end;
            end loop;
        end;
    begin
        group_id_v := 0;
        sanity_check_v := 0;
        select count(*) into max_tables_v from xvvizster_TABLE_edges;
        loop
            sanity_check_v := sanity_check_v + 1;
            if  sanity_check_v  >  max_tables_v  then  raise_application_error(–
20999,'plsql:my_table_groups_build:sanity_check_falid:(sanity_check_v)=
('||sanity_check_v||')'); end if;
            --
            -- find the start of a new chain of tables
            --
            source_id_v := null;
            get_start_of_a_new_chain (source_id_v);
            --
            -- if we can't find one we are done
            -- otherwise fill in the rest of the chain
            --
            if source_id_v is null then exit; end if;
            fill_chain (source_id_v);
        end loop;
    end;
/
show errors
select a.group_id,b.owner,b.object_name
from my_table_groups a
    ,my_dba_objects b
where a.object_id = b.object_id
order by group_id,owner,object_name
/,
```

A code for building communities that configures for displaying results using other display programs includes the following example:

```
drop table my_table_groups
/
create table my_table_groups
(
   group_id number not null
, object_id number not null
)
/
create index my_table_groups_pk on my_table_groups (object_id,group_id)
/
alter table my_table_groups
   add constraint my_table_groups_pk primary key (object_id,group_id)
/
drop table xvvizster_TABLE_edges
/
create table xvvizster_TABLE_edges
as
select distinct *
from vvizster_TABLE_edges
where source_id != 0
and target_id != 0
/
create or replace
procedure my_table_groups_build
as
   source_id_v number;
   group_id_v number;
   sanity_check_v number;
   max_tables_v number;
   procedure get_start_of_a_new_chain (source_id_p in out number) is
   begin null;
   --
   -- look for a table not already in a group
   -- if we don't find one then do nothing (see NO_DATA_FOUND exception handler below)
   --
      select min(source_id)
      into source_id_p
      from xvvizster_TABLE_edges
      where source_id != 0
      and target_id != 0
      and not exists
      (
        select null
        from my_table_groups
        where my_table_groups.object_id = xvvizster_TABLE_edges.source_id
      )
      and rownum = 1
      ;
      if source_id_p is null then raise no_data_found; end if;
   --
   -- since there was no NO_DATA_FOUND error we must have an object we have not seen yet
   -- so start the chain by recording this table
   --
      group_id_v := group_id_v + 1;
      insert into my_table_groups (group_id,object_id) values (group_id_v,source_id_p);
      exception when no_data_found then null;
   end;
   procedure fill_chain (object_id_p in number) is
      object_id_v number;
   begin null;
      for r1 in (
            select decode(source_id,object_id_p,target_id,source_id) object_id
            from xvvizster_TABLE_edges
            where (
                source_id = object_id_p and target_id != 0 or
                target_id = object_id_p and source_id != 0
                )
            ) loop null;
         begin null;
          select object_id
          into object_id_v
          from my_table_groups
          where object_id = r1.object_id
```

```
                ;
                exception when no_data_found then
                  insert into my_table_groups
                    (group_id,object_id)
                    values
                    (group_id_v,r1.object_id)
                ;
                fill_chain (r1.object_id);
              end;
          end loop;
        end;
      begin
        group_id_v := 0;
        sanity_check_v := 0;
        select count(*) into max_tables_v from xvvizster_TABLE_edges;
        loop
          sanity_check_v := sanity_check_v + 1;
          if sanity_check_v > max_tables_v then raise_application_error(-
20999,'plsql:my_table_groups_build:sanity_check_falid:(sanity_check_v)=
('||sanity_check_v||')'); end if;
          --
          -- find the start of a new chain of tables
          --
          source_id_v := null;
          get_start_of_a_new_chain (source_id_v);
          --
          -- if we can't find one we are done
          -- otherwise fill in the rest of the chain
          --
          if source_id_v is null then exit; end if;
          fill_chain (source_id_v);
        end loop;
      end;
      /
      show errors
      select a.group_id,b.owner,b.object_name
      from my_table_groups a
          ,my_dba_objects b
      where a.object_id = b.object_id
      order by group_id,owner,object_name
      /
```

Grouping at step 450 may include formatting the output data for display at step 460, and creating a network of nodes at step 470. For example, the following code may be used to display tables in communal nodes including formatting the output for display and creating a network of nodes:

```
, vvizster_TABLE_edges as (
          select * from paired_tables
          union all
          (
          select 0,source_id from paired_tables
          union
          select 0,target_id from paired_tables
          )
        )
, vvizster_nodes as (
          select object_id,object_name
          from my_dba_objects
        )
, my_v$database as (
          select name
          from v$database
        )
, vizster_data as (
          select 1 select_id,0 userid,cast(null as varchar2(30)) name,'<!--
prefuse graph writer :: '||to_char(sysdate,'DY Mon DD hh24:mi:ss rrrr')||'-->' text
from dual union all
          select 2 select_id,0 userid,cast(null as varchar2(30)) name,'<graph
directed="0">' from dual union all
          select 3 select_id,0 userid,cast(null as varchar2(30)) name,' <!--
nodes -->' from dual union all
          select 4 select_id,0 userid,cast(null as varchar2(30)) name,' <node
id="0"> <att name="name" value="'||name||'"/> </node>' from my_v$database union
all
```

-continued

```
        select 5 select_id,           object_id, object_name,' <node
id='"'||object_id||'"'> <att name="name" value='"'||object_name||'"'/> </node>' from
vvizster_nodes union all
        select 6 select_id,0 userid,cast(null as varchar2(30)) name,' <!--
edges -->' from dual union all
        select 7 select_id,0 userid,cast(null as varchar2(30)) name,' <edge
source='"'||source_id||'"'target='"'||target_id||'"'> </edge>' from vvizster_table_edges
union all
        select    8    select_id,0    userid,cast(null    as    varchar2(30))
name,'</graph>' from dual
        )
    select text
    from vizster_data
    order by select_id,userid
```

Method 400 extracts the metadata from data dictionary tables, transforms the metadata into a set of relationships in a node form, formats these relationships into an XML data stream for display, and writes the information to a file. This file may then be loaded into display software, such as Vizster, for display of one or more pictures for visualizing the communities of tables, and more particularly for determining if any community is imperfect because it includes one or more interrelations to a table in another community. The following is a portion of one of the files that the SQL above generates using the SQL workload and database tables:

```
<!-- prefuse graph writer -->
<graph directed="0">
    <!-- nodes -->
    <node id="0">
        <att name="name" value="GBDHS03A"/>
    </node>
    <node id="29896">
        <att name="name" value="AUDIT_DIM"/>
    </node>
    <node id="29900">
        <att name="name" value="AUDIT_DIM_SALES"/>
    </node>
    ...
    <!-- edges -->
    <edge source="30518" target="31212"> </edge>
    <edge source="0" target="31212"> </edge>
    <edge source="0" target="30518"> </edge>
    <edge source="6742887" target="6742889"> </edge>
    ...
</graph>.
```

Figure 5:
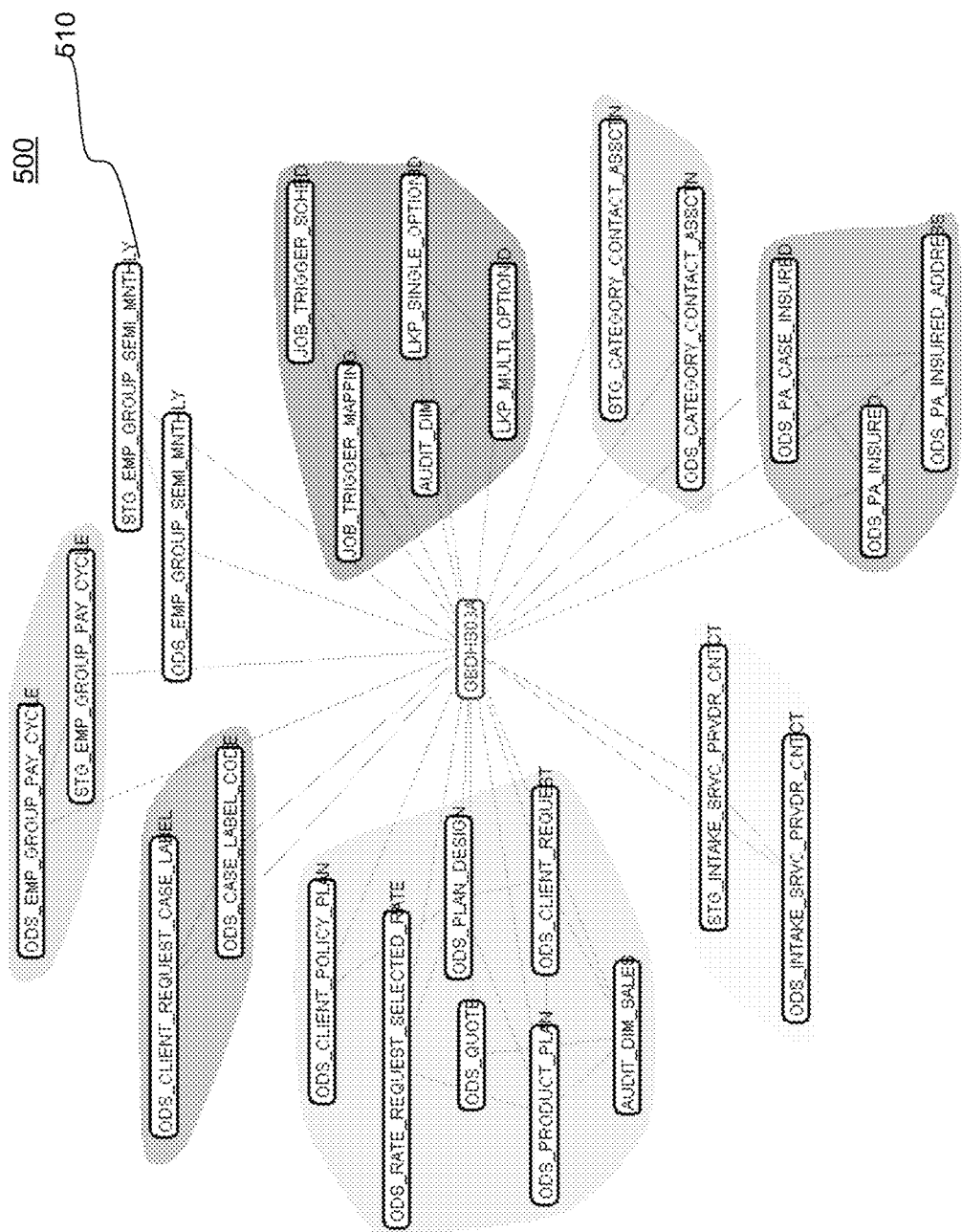
FIG. 5 illustrates the output of data represented in communities.

FIG. 5 depicts the output of table relations represented in communities and results from grouping step 450 of method 400. The relationships have been extracted from the data, transformed into node form, and formatted into a data stream for display and are output to and displayed using Vizster. As may be seen in FIG. 5, the communities of tables are based on the interrelationship data that has been extracted from the underlying metadata and the associated workload, transformed into node form and formatted as provided herein. Every community is identified as a blob of data and the specific tables are identified within each community by table title. For example, community of tables 510 represents a unique community that is a perfect community. A perfect community is a community that shares data only within the community itself based on the analyzed SQL workload. Community 510 includes two tables STG_EMP_GROUP_PAY_CYCLE and ODS_EMP_GROUP_SEMI_MNTHLY.

There may also be community of tables (not shown) representing an imperfect community. An imperfect community is a community that shares data with other communities. In some cases, an imperfect community may share data only with one other community. Imperfect communities may have minimal references to tables outside of the community or may share data with numerous other communities having considerable overlap with these other communities based on the analyzed SQL workload.

Representing the relationships between the communities of tables as shown in FIG. 5 provides a depiction and view to understand the data and the table relationships within the relational database. Knowledge of the interrelations provides opportunity to collect statistics by community. If statistics are collected based on these communities of tables, then the risk of causing the performance of SQL statements to degrade is minimized for imperfect communities, and eliminated for perfect communities. For example, community 510 contains two tables STG_EMP_GROUP_PAY_CYCLE and ODS_EMP_GROUP_SEMI_MNTHLY. This community of tables was derived by looking at the SQL workload running on a database. This particular community of tables is in fact a perfect community. This means that not only do all the tables in this community reference each other, but additionally, the tables do not connect or reference to any tables outside the community for the SQL workload analyzed. The community is self contained. Since this community is constructed by analyzing SQL queries, all SQL queries that reference these two tables satisfies the same restriction; the SQL referencing these two tables references only these two tables and no others. Thus, there is zero risk of a cascading performance failure for any SQL that references either of these two tables if statistics are collected on both of these two tables. Hence collection of statistics by community of tables enables perfect communities to be identified and acted upon.

Similar to identifying perfect communities, imperfect communities may be identified. The imperfect communicates may be dealt with based on the interrelation with other communities in order to minimize negative side of effects of the imperfect community and minimize cascading. These communities may be visualized by examining the relational database and feeding the data into social networking to display the visual representation of the community relationships. That is, communities that overlap only with each other may be deemed a larger perfect community when combined and/or multiple communities may be configured for statistics collection in a batch collection to minimize cascading. Imperfect communities may be dealt with by applying hints, such as telling the database what to do instead of giving information and letting the database decide for itself and/or ignoring that the statement is a problem and running as if the statement is not a problem and monitoring or tracking for any cascading issues.

Though FIG. 5 illustrates some perfect communities, and as discussed imperfect communities may also exist, the coherency of the communities analyzed may be varied, that is relaxed or tightened, as necessary to include data within communities. Varying the coherency of the communities may effectively combine and divide communities. The benefit of optimizing and working with perfect communities is that since no tables in the community are related to any other table outside their community, all SQL that references the tables inside a perfect community do not cross community boundaries and therefore optimizing the community presents no danger of cascading problems.

Large imperfect community of tables may create difficulties in collecting statistics on all the included tables at one time as a result of the large time required to do so, whether table is imperfect or not. As described above, the coherency may be varied in order to manipulate the size of the communities to ensure that the size is one that is manageable. This variation in the coherency may mean creating communities that are imperfect and have links to other communities but may be of a smaller more workable size.

An imperfect community of tables has at least one reference to another community, which implies the existence of at least one SQL statement in the SQL workload that crosses community boundaries. Since the present solution involves collecting statistics by community, using imperfect communities of tables means there is at least one SQL statement that could be subject to the cascading performance failure described earlier. However, since these communities are created through an analysis of a SQL workload, the offending SQL statement(s) are known and steps may be taken to mitigate the risk of a performance slowdown. For example, hints in the SQL may be used to make the SQL operate as desired, or information may be gathered so imperfect communities may not cause that great of an effect. That is, just because a SQL query may have an issue does not mean that the query will.

FIG. 5 illustrates perfect communities of tables that exist in the relationship data for SQL workloads. By collecting statistics using perfect communities, there is zero risk of cascading performance failures. A number of the communities remain large, so from a practical reality, these large communities may require a break down into two or more smaller communities even if the smaller communities are imperfect. This makes statistics collection possible to do in a reasonable time frame for each community, but introduces the possibility of SQL statements that have table references in more than one community. Such SQL statements are potential victims of the performance slowdowns such as cascading that generally are avoided. Knowing these potentially problematic statements exist and which statements are problematic, the database administrator may manage the risk.

Figure 6:
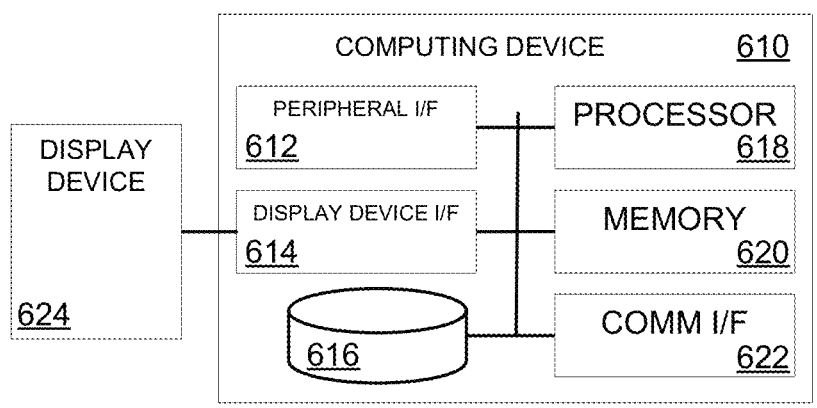
FIG. 6 illustrates a computing device that may be used to implement features with reference to FIGS. 1-5.

FIG. 6 shows an example computing device 610 that may be used to implement features describe above with reference to FIGS. 1-5. The computing device 610 includes a processor 618, memory device 620, communication interface 622, peripheral device interface 612, display device interface 614, and data storage device 616. FIG. 6 also shows a display device 624, which may be coupled to or included within the computing device 610.

The memory device 620 may be or include a device such as a Dynamic Random Access Memory (D-RAM), Static RAM (S-RAM), or other RAM or a flash memory. The data storage device 616 may be or include a hard disk, a magneto-optical medium, an optical medium such as a CD-ROM, a digital versatile disk (DVDs), or Blu-Ray disc (BD), or other type of device for electronic data storage.

The communication interface 622 may be, for example, a communications port, a wired transceiver, a wireless transceiver, and/or a network card. The communication interface 622 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 612 is configured to communicate with one or more peripheral devices. The peripheral device interface 612 operates using a technology such as Universal Serial Bus (USB), PS/2, Bluetooth, infrared, serial port, parallel port, and/or other appropriate technology. The peripheral device interface 612 may, for example, receive input data from an input device such as a keyboard, a mouse, a trackball, a touch screen, a touch pad, a stylus pad, and/or other device. Alternatively or additionally, the peripheral device interface 612 may communicate output data to a printer that is attached to the computing device 610 via the peripheral device interface 612.

The display device interface 614 may be an interface configured to communicate data to display device 624. The display device 624 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 614 may operate using technology such as Video Graphics Array (VGA), Super VGA (S-VGA), Digital Visual Interface (DVI), High-Definition Multimedia Interface (HDMI), or other appropriate technology. The display device interface 614 may communicate display data from the processor 618 to the display device 624 for display by the display device 624. As shown in FIG. 6, the display device 624 may be external to the computing device 610, and coupled to the computing device 610 via the display device interface 614. Alternatively, the display device 624 may be included in the computing device 600.

An instance of the computing device 610 of FIG. 6 may be configured to perform any feature or any combination of features described above as performed by the client device 110. Alternatively or additionally, the memory device 620 and/or the data storage device 616 may store instructions which, when executed by the processor 618, cause the processor 618 to perform any feature or any combination of features described above as performed by apparatus 100. Alternatively or additionally, each or any of the features described above as performed by apparatus 100 may be performed by the processor 618 in conjunction with the memory device 620, communication interface 622, peripheral device interface 612, display device interface 614, and/or storage device 616. More specifically, computing device 610 may be used for client 105 to access server 115. Alternatively, computing device 610 may be configured as server 115, wherein processor 618 may be processor 125, memory device 620 and/or storage device 615 may be disk 130.

Figure 7:
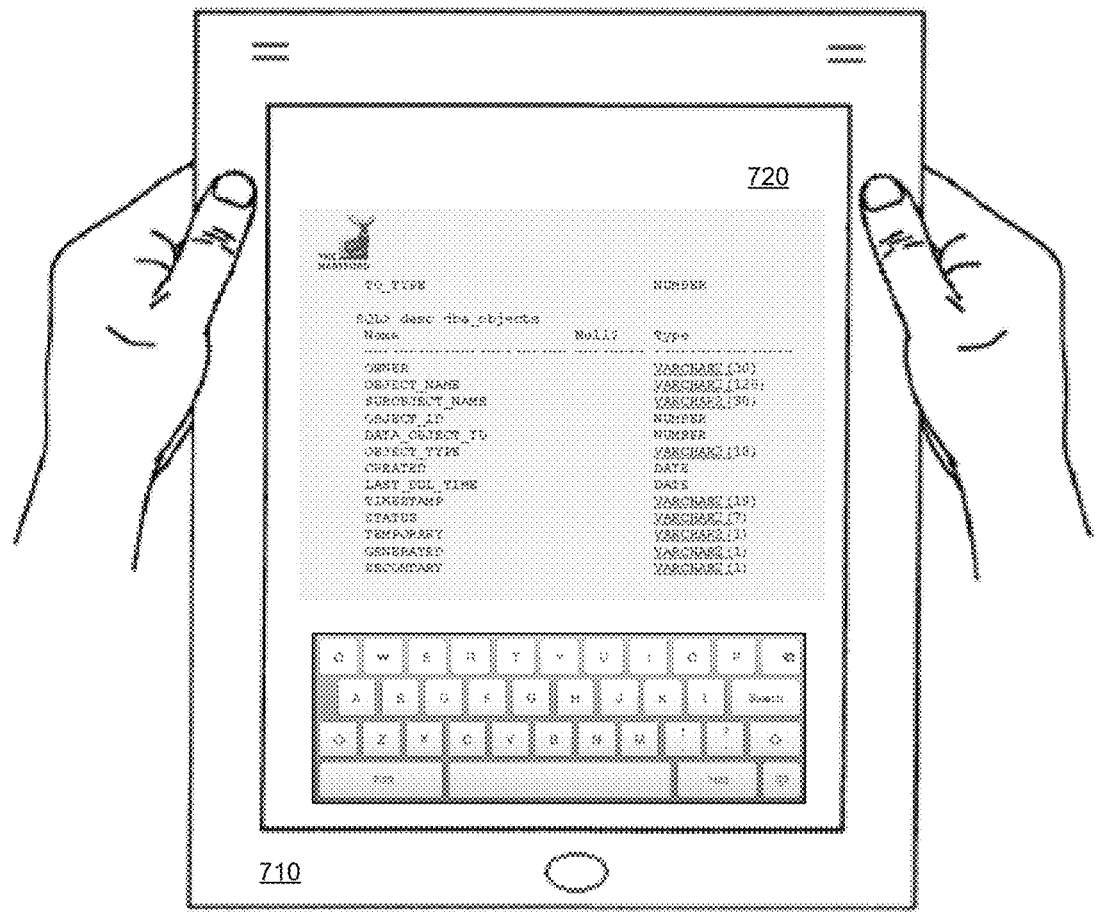
FIG. 7 illustrates a tablet computer as a more specific example of the computing device of FIG. 6.

FIG. 7 shows a tablet computer 710 that is a more specific example of the computing device 610 of FIG. 6. The tablet computer 710 may include a processor (not depicted), memory device (not depicted), communication interface (not depicted), peripheral device interface (not depicted), display device interface (not depicted), storage device (not depicted), and touch screen display 720, which may possess characteristics of the processor 618, memory device 620, communication interface 622, peripheral device interface 612, display device interface 614, storage device 616, and display device 624, respectively, as described above with reference to FIG. 6. The touch screen display 720 may receive user input using technology such as, for example, resistive sensing technology, capacitive sensing technology, optical sensing technology, or any other appropriate touch-sensing technology.

Although examples are provided above with reference to FIGS. 1-7 wherein apparatus 100 is controlled by the insurance company, the features described above may also be used, mutatis mutandis, in situations where the service provider uses apparatus 100 to optimize a database, for example.

Although examples are provided above that relate to an insurance company and a service provider that provides services to the insurance company, the features described above with reference to FIGS. 1-7 are also applicable and/or may be used by, mutatis mutandis, any type of business, any type of non-business organization, and/or any individual.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although the methods and features are described above with reference to the example architecture of FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-7 may be used alone without the other features and elements or in various combinations with or without other features and elements. Sub-elements and/or sub-steps of the methods described above with reference to FIGS. 1-7 may be performed in any arbitrary order (including concurrently), in any combination or sub-combination.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention as set forth in the claims hereinafter.

What is claimed is:

1. A system for collecting statistics on a database for performing at least one structured query language (SQL) query, the system comprising:
 a memory for storing data in a database organized in a plurality of tables; and
 a processor coupled to the memory, the processor, accessing the memory, to:
  process the at least one SQL query related to insurance data;
  determine one or more interrelationships of the plurality of tables in the database by parsing the SQL query and identifying common dependencies of the tables after parsing the SQL query, wherein the determining interrelationships and identifying common dependencies at least includes identifying perfect communities and imperfect communities and for imperfect communities identifying one or more of the plurality of tables that reference another community;
  transform the determined interrelationships of the plurality of tables into a group representing communities of tables based on the common dependencies by quantifying a risk of the imperfect communities and adding in additional tables with the plurality of tables;
  perform the at least one SQL query on the transformed group of tables.

2. The system of claim 1 wherein the plurality of tables are interrelated.

3. The system of claim 1 further comprising a display on which a representation of the grouping of communities of tables is rendered.

4. The system of claim 3 wherein the display presents a depiction of the interrelation using communities of tables.

5. The system of claim 1 further comprising an optimizer for collecting statistics on the plurality of tables and the collected statistics are used to optimize the insurance related query.

6. The system of claim 1 wherein the communities of tables represent at least one perfect community of tables.

7. The system of claim 1 wherein the communities of tables represent at least one imperfect community of tables.

8. The system of claim 1 wherein a risk associated with the at least one table referencing another community of tables is managed using hints.

9. The system of claim 1 wherein a risk includes cascading.

10. The system of claim 1 wherein the insurance related query is a query for a client request rate fact quote.

11. A method of collecting statistics on a database for performing at least one structured query language (SQL) query, the method comprising:
 processing at least one SQL query related to insurance data;
 determining one or more interrelationships of tables in a database stored in a memory device by parsing the query and determining common dependencies of the tables identified after the parsed query, the one or more interrelationships of tables responsive to the at least one SQL query, wherein the determining interrelationships and identifying common dependencies at least includes identifying perfect communities and imperfect communities and for imperfect communities identifying one or more of the tables that reference another community;
 transforming the determined interrelationships of tables into a group representing communities of tables with the one or more interrelationships of tables based on the common dependencies by quantifying a risk of the imperfect communities and adding in additional tables with the tables; and
 perform the at least one SQL query on the transformed group of tables, wherein the one or more interrelationships of the plurality of tables in the database represent insurance data.

12. The method of claim 11 further comprising collecting statistics on the at least one community of tables based on the at least one insurance related SQL query using the collected statistics to optimize the insurance related query.

13. The method of claim 11 wherein the at least one insurance related SQL query comprises client request rate fact quotes.

14. The method of claim 11 wherein the communities of tables represent at least one perfect community of tables.

15. The method of claim 11 wherein the communities of tables represent at least one imperfect community of tables.

16. The method of claim 15 further comprising denoting for each of the at least one imperfect community of tables the at least one table referencing another community of tables.

17. The method of claim 16 further comprising managing a risk associated with the denoted at least one table.

18. The method of claim 17 wherein the risk includes cascading.

19. The method of claim 17 wherein the risk is managed using hints.

20. The method of claim 11 further comprising displaying the grouping of tables to graphically depict the relationships of tables.

21. A non-transitory computer readable medium including hardware design code stored thereon which when executed by a processor cause the system to perform a method for collecting statistics on a database for performing at least one insurance related SQL query, the method comprising:

processing at least one insurance related SQL query;

determining one or more interrelationships of tables of a database stored in a memory device by parsing the query and determining the dependencies of the tables identified after the parsing query, wherein the one or more relationships of tables responsive to the at least one insurance related SQL query, wherein the determining interrelationships and identifying common dependencies at least includes identifying perfect communities and imperfect communities and for imperfect communities identifying one or more of the plurality of tables that reference another community;

transforming the determined interrelationships of tables into a group representing communities of tables with the interrelationships of tables based on common dependencies by quantifying a risk of the imperfect communities and adding in additional tables with the plurality of tables; and perform the at least one SQL query on the transformed group of tables, wherein the one or more interrelationships of tables represent data associated with at least one aspect of insurance data.

* * * * *